E. T. THOMAS.
Sewing-Machine.

No. 219,038. Patented Aug. 26, 1879.

Witnesses.
L. F. Connor.
N. E. Whitney.

Inventor.
Eddy T. Thomas,
by Crosby & Gregory
Atty

UNITED STATES PATENT OFFICE.

EDDY T. THOMAS, OF NEW YORK, N. Y., ASSIGNOR TO GOLD MEDAL SEWING MACHINE COMPANY, OF ORANGE, MASS.

IMPROVEMENT IN SEWING-MACHINES.

Specification forming part of Letters Patent No. 219,038, dated August 26, 1879; application filed July 20, 1878.

*To all whom it may concern:*

Be it known that I, EDDY T. THOMAS, of the city, county, and State of New York, have invented an Improvement in Sewing-Machines, of which the following description, in connection with the drawings forming a part thereof, is a specification.

The object of this invention is, without preliminary or experimental sewing, to select and insure a certain exact length of stitch, the length selected being portrayed near the feed-adjusting device as a line corresponding in length with the length of the stitch selected.

The invention consists in the application to a sewing-machine, for co-operation with the feed-adjusting devices, of a stitch-index provided with dashes or lines to correspond substantially in length with the length of the stitches which the feeding devices will produce if adjusted in accordance with or opposite any one of the said lines.

Figure 1:
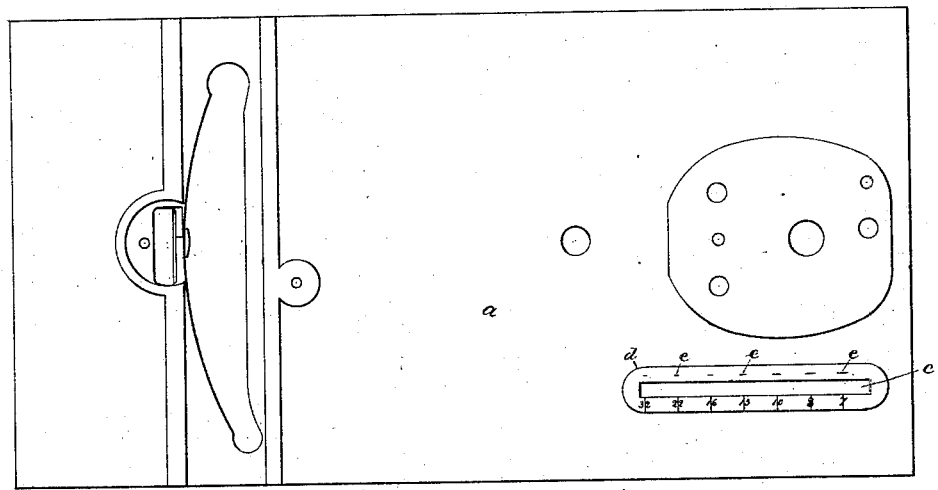
Figure 2:
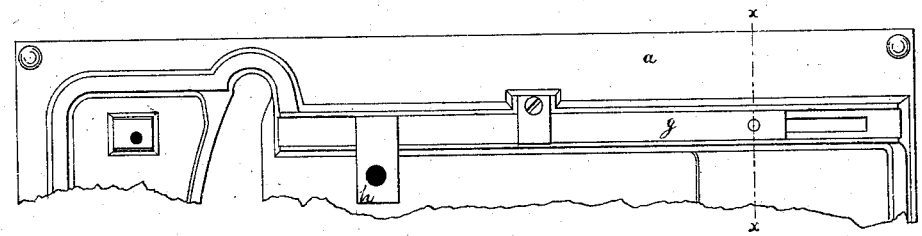
Figure 3:
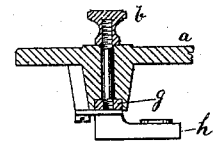

Figure 1 represents in top view the cloth-plate or bed of a sewing-machine provided with a feed-index embodying one form of this invention, the thumb-nut of the feed-adjusting mechanism being omitted; Fig. 2, an underside view thereof; and Fig. 3, a section on the line *x x*, Fig. 2.

The bed-plate *a* is and may be of usual construction, as may also be the feeding devices.

The projection or nut *b*, or other device, which is engaged by hand to change the length of feed-stroke, is in this instance placed to slide in or over a slot, *c*, made in the bed-plate; and at one side of the path over which the said nut travels or is moved is a portion, *d*, upon which is made a series of dashes or lines, *e*, each corresponding substantially in length with the length of stitch which will be produced by the feeding devices when the projection or nut is opposite it.

It is obvious that this invention is applicable to all kinds of sewing-machines making either one or two threaded stitches; that the position of the dashes or index-lines, for length of feed or stitch, may be placed at any part of the machine over and past which the feed-adjusting nut *b* or lever—such as employed in the Singer, Wheeler & Wilson, Grover & Baker, or Willcox & Gibbs machines, or in other well-known machines—moves or passes when the feed-stroke is to be altered.

The numbers 7, 8, &c., near the slot may designate the number of stitches to the inch.

It is well known that the majority of people using sewing-machines, (especially for family work, the operators being unskilled,) before sewing any particular piece of material, where good work is desired, test the length of stitch upon a separate piece of cloth.

These index-lines herein described will obviate this waste of time, for they will enable the operator to see and select any desired length of stitch, and to adjust the feed-regulator opposite the line which indicates the desired length.

In the drawings, *g* is a bar having a lug, *h*, upon which is pivoted and vibrates the lever which actuates the feeding-bar horizontally.

In the drawings, the lever and feed-bar are omitted, as those parts are well known and common to the Home sewing-machine.

I claim—

In a sewing-machine, the projection or nut *b*, which is made movable to vary or regulate the length of feed-stroke, combined with a portion of the sewing-machine bed or frame provided with a series of dashes differing uniformly in length, each dash indicating by its length the exact length of the stitch which will be produced by the machine when the projection is placed opposite it, substantially as shown and described.

In testimony whereof I have signed my name to this specification in the presence of two subscribing witnesses.

EDDY T. THOMAS.

Witnesses:
ALLEN P. CREQUE,
SPENCER C. DOTY.